United States Patent [19]
Frost, Jr.

[11] Patent Number: 5,042,425
[45] Date of Patent: Aug. 27, 1991

[54] AQUARIUM AND BIRD AND ANIMAL CONTAINMENT SYSTEM

[76] Inventor: Robert W. Frost, Jr., 8600 Woodlake Dr., Haughton, La. 71037

[21] Appl. No.: 438,663

[22] Filed: Nov. 20, 1989

[51] Int. Cl.⁵ .............................................. A01K 63/00
[52] U.S. Cl. ...................................................... 119/5
[58] Field of Search ........................... 119/3, 5; 47/69; D30/101, 102, 103, 104, 105, 106

[56] References Cited

U.S. PATENT DOCUMENTS

| | | | |
|---|---|---|---|
| D. 152,456 | 1/1949 | Buxbaum et al. | D30/104 |
| D. 196,107 | 8/1963 | Schur et al. | D30/104 |
| 3,324,829 | 6/1967 | Jose et al. | 119/5 |
| 3,418,973 | 12/1968 | Saito | 119/5 |
| 3,557,753 | 1/1971 | Dantoni | 119/5 X |
| 3,661,262 | 5/1972 | Sanders | 119/5 X |
| 3,774,575 | 11/1973 | Patterson | 119/5 |
| 4,151,810 | 5/1979 | Wiggins | 119/5 |
| 4,365,590 | 12/1982 | Ruggieri et al. | 119/17 X |

*Primary Examiner*—John J. Wilson
*Assistant Examiner*—R. Thomas Price
*Attorney, Agent, or Firm*—John M. Harrison

[57] ABSTRACT

An aquarium and bird and animal containment system for displaying marine life, birds and animals, which system includes an aquarium support or rack for displaying one or more aquariums or tanks containing fish and or other marine life, a bird and animal support or rack for supporting bird and animal cages and a cabinet disposed between the aquarium support and the bird and animal support. The cabinet contains a sink, a water supply and distribution system for supplying water to the aquariums and the bird and animal cages and an air supply and distribution system for supplying air to biological filters located in the aquariums. An overflow drain system for draining water from the aquariums and an electrical system for sypplying electricity to the aquarium support and the bird and animal support are also provided. In a preferred embodiment the aquariums are also provided with lighting, mechanical power filters and heaters and are accessed by hinged doors and covers, while the bird and animal cages are slidably mounted in the bird and animal support behind two sets of sliding "Plexiglass" windows and are provided with pressure actuated valves connected to the water supply and distribution system.

13 Claims, 4 Drawing Sheets

AQUARIUM AND BIRD AND ANIMAL CONTAINMENT SYSTEM

BACKGROUND OF THE INVENTION

1. Field of the Invention

This invention relates to display systems for aquariums and bird and animal cages and more particularly, to an aquarium and bird and animal containment system which includes in a first preferred embodiment, a cabinet containing a sink and a water and air supply and distribution system, and aquarium support or rack provided on one side of the cabinet for supporting multiple stacked sets of aquariums or tanks and a bird and animal support provided on the opposite side of the cabinet for slidably receiving and supporting bird and animal cages. The water distribution system is characterized by an automatic water distribution system for the aquariums, as well as the bird and animal cages and the containment system includes mechanical and biological filtration systems and heaters for the aquariums, a drain system for draining the aquariums and an electrical system for servicing the various mechanical features in the aquariums and the bird and animal support. In a most preferred embodiment of the invention the aquarium support is designed with hinged frontal doors or panels and transparent, hinged lids provided with fluorescent lights for accessing the aquariums, and the bird and animal support includes slidably mounted bird and animal cages provided with automatic, pressure-operated water supply valves and two sets of vertically sliding, "Plexiglass" windows for acessing the bird and animal cages. The water in the aquariums is thus filtered, aerated and temperature-controlled to accommodate a wide variety of fish and other marine life.

One of the problems realized in displaying birds, animals and marine life such as fish in pet shops and other stores having pet departments, is that of maintaining the cages and aquariums at the desired temperature and clenaliness to insure the health of the occupants and the marketability of the fish, birds and animals to the public. Aquariums are typically displayed in one area of the pet shop or store, while the bird and animal cages are located in another area, since the techniques for cleaning and maintaining the aquariums or tanks are different from those required to maintain the bird and animal cages in a proper condition of cleanliness. Access to a sink or other area where cleaning can be accomplished is frequently difficult or inconvenient, with such access normally being provided in a back room or in some other area which is remotely located from the aquariums and the bird and animal cages.

2. Description of the Prior Art

Various types of aquariums for maintaining fish and other marine life in a healthy condition are known in the art. Typical of these aquariums is the "Integrated Aquarium", detailed in U.S. Pat. No. 4,082,062, dated Apr. 4, 1978, to Donald J. Rodemeyer. The integrated aquarium includes all of the necessary mechanical functions, including an air pump, lighting and heating, located in a compartment provided as part of the aquarium base. Those components which are particularly subject to mechanical failure are mounted in a slide-out drawer provided as a part of the base, for easy access. The preferred embodiment includes an especially pleasing, esthetic, hexagonal design which includes a thin, unobstructive cover instead of the usual bulky light relfector hood mounted on the aquarium top. U.S. Pat. No. 4,380,968, dated Apr. 26, 1983, to Arthur B. Renny, entitled "Art of Exhibiting Fish", includes a vertical aquarium consisting of a transparent fish tank and a metal cowl. The aquarium requires the usual accessories for proper operation and stands vertically, having a height greater than its width or depth. The bowl also stands vertically and has a height, width and depth which are greater than that of the aquarium and is designed to silence, at least in part, the noise from the operation of the aquarium. U.S. Pat. No. 4,606,821, dated Aug. 19, 1986, to David D'Imperio, details a "Sectionalized Integrated Aquarium". The aquarium is formed by two interlocing, U-shaped members and the area thus formed is divided into two compartments, an aquarium department and a mechanical filtering chamber. The filtering chamber contains filters and a reservoir and the aquarium compartment contains a bottom filter. The sections are divided by a vertical wall which has internal plumbing members and serves as a conduit, as well as a divider. Water enters the aquarium section from the reservoir through the vertical panel and piping and is released from the aquarium compartment to the mechanical filtering chamber by waterfall action through slots in the upper part of the vertical panel. Water is constantly circultated between the sections and is continuously aerated and filtered. U.S. Pat. No. 4,684,462, dated Aug. 4, 1987, to George E. Augustyniak, details a "Filteration, Aeration, and Water Level Control Means for Aquariums". The control means is portable and universally adaptable for use in conjunction with any conventional aquarium and for incorporation into the recirculation water filtration and aeration system thereof. The device is designed to automatically maintain a predetermined level of water in an aquarium tank and continually remove water solely from the top surface of the water-containing aquarium tank and filtering and aerating the same when in operation. The water control device is adapted to be supported on the wall of an aquarium tank and includes an open-top overlfow receptacle positioned within the aquarium tank, an open-top prefilter receptable positioned externally of the aquarium tank. The tank has an interior divided into a water-receiving department and a drainage compartment by a vertical partition wall and a siphon tube for transferring water from the bottom of the overflow receptacle to the bottom of the water-receiving chamber is also provided. The siphon tube has both of its ends at the same level, which level is below the level of the top edge of the prefilter receptacle partition wall, the overflow of prefilter receptable having water aeration means embodied therein and each receptacle may also have a filtration means incorporated therein. U.S. Pat. No. 4,773,008, dated Sept. 20, 1988, to R. L. Schroeder, details an "Environmental Control of an Aquarium". The device includes apparatus for controlling the environment of a tank adapted to be filled with water, where the tank includes multiple control apparatus. The invention utilizes a microprocessor having multiple control signal inputs and multiple control signal outputs. Apparatus is provided for coupling each of the control signal outputs to each of the control apparatus. A program device is coupled to the microprocessor signal input, such that the data can be entered for the control of each of the multiple control signal outputs. Moreover, a timing apparatus is likewise coupled to one of the plurality of signal inputs to allow the microprocessor to calculate time of day, such that data entered by the program device will selectively control the function of each of the control apparatus as necessary to maintain the environment within the limits set by the operator. U.S. Pat. No. 4,787,336, dated Nov. 29, 1988, to W. Scott Lineberry, details a "Controlled Environment Habitat for Aquariums". The habitat includes a transparent housing having, top bottom and side walls containing plant or animal life which is submerged in an aquarium. A forced air pump is connected by a tubular conduit to the housing for introducing air into the housing. Perforations in one wall provide means for passing air out of the housing and when air pressure is reduced, permits water to flow into the habitat to provide nourishment to the life contained therein.

It is an object of this invention to provide an aquarium and bird and animal containment system which is characterized in a first preferred embodiment by an aquarium support or rack containing multiple tanks or aquariums, in a second preferred embodiment, by the aquarium support and a bird and animal support or rack containing bird and animal cages and in a third preferred embodiment, by the aquarium support, bird and animal support and a cabinet provided between the aquarium support and the bird and animal support for supplying water and air to the aquariums and water to the bird and animal cages.

Another object of the invention is to provide an aquarium and bird and animal containment system which is compact, easily accessible and locates multiple, heated, aerated and filtered aquariums or tanks and removable bird and animal containers in easily viewable areas separated by a cabinet having a sink and a water heater and designed to supply air, water and electricity to the aquariums or tanks and water and electricity to the bird and animal cages.

Still another object of the invention is to provide an easily viewable and maintained combination aquarium and bird and animal containment system, which system includes a cabinet provided with a water heater, air compressor and a water and air supply and distribution system for the aquariums, a water supply and distribution system for the bird and animal cages and an electrical system for both the aquariums and the bird and animal cages. Also provided are aquariums fitted with heaters, dual filtration systems combining both biological and mechanical filtration processes, an automatic overflow drain and water replacement system and sliding "Plexiglass" windows located on the bird and animal support to facilitate quick and easy access to the slidably mounted bird and animal cages and protection for the birds and animals in the cages.

A still further object of this invention is to provide an aquarium and bird and animal containment system which includes a cabinet provided with two sets of access doors, a double sink and a water and air supply and distribution system, an aquarium support fitted with multiple, stacked aquariums located in sets on one side of the cabinet and a bird and animal support provided with vertically slidable "Plexiglass" access doors and slidably mounted bird and animal cages, located on the opposite side of the cabinet, which aquariums are further provided with mechanical and biological filter systems, a refill and overflow water supply and drain system and heaters and the bird and animal cages are fitted with automatic, "on-demand" watering systems.

SUMMARY OF THE INVENTION

These and other objects of the invention are provided in an aquarium and bird and animal containment system which in a most preferred embodiment, includes an upright cabinet fitted with at least one pair of access doors, a double sink and further provided with a water and air supply and distribution system; and aquarium support located on one side of the cabinet for supporting and displaying multiple, stacked sets of aquariums or tanks, wherein water and air are supplied to the aquariums; mechanical and biological filters and heaters located in the aquariums for aerating, filtering and heating the water therein; a drain system connected to the aquariums for drainage thereof; and a bird and animal support positioned on the opposite side of the cabinet for slidably supporting and containing multiple bird and animal cages, wherein the bird and animal support is provided with automatic watering systems which dispense water supplied from the cabinet on demand to birds and animals located in the cages.

BRIEF DESCRIPTION OF THE DRAWINGS

The invention will be better understood by reference to the accompanying drawings, wherein.

DESCRIPTION OF THE PREFERRED EMBODIMENTS

Figure 1:
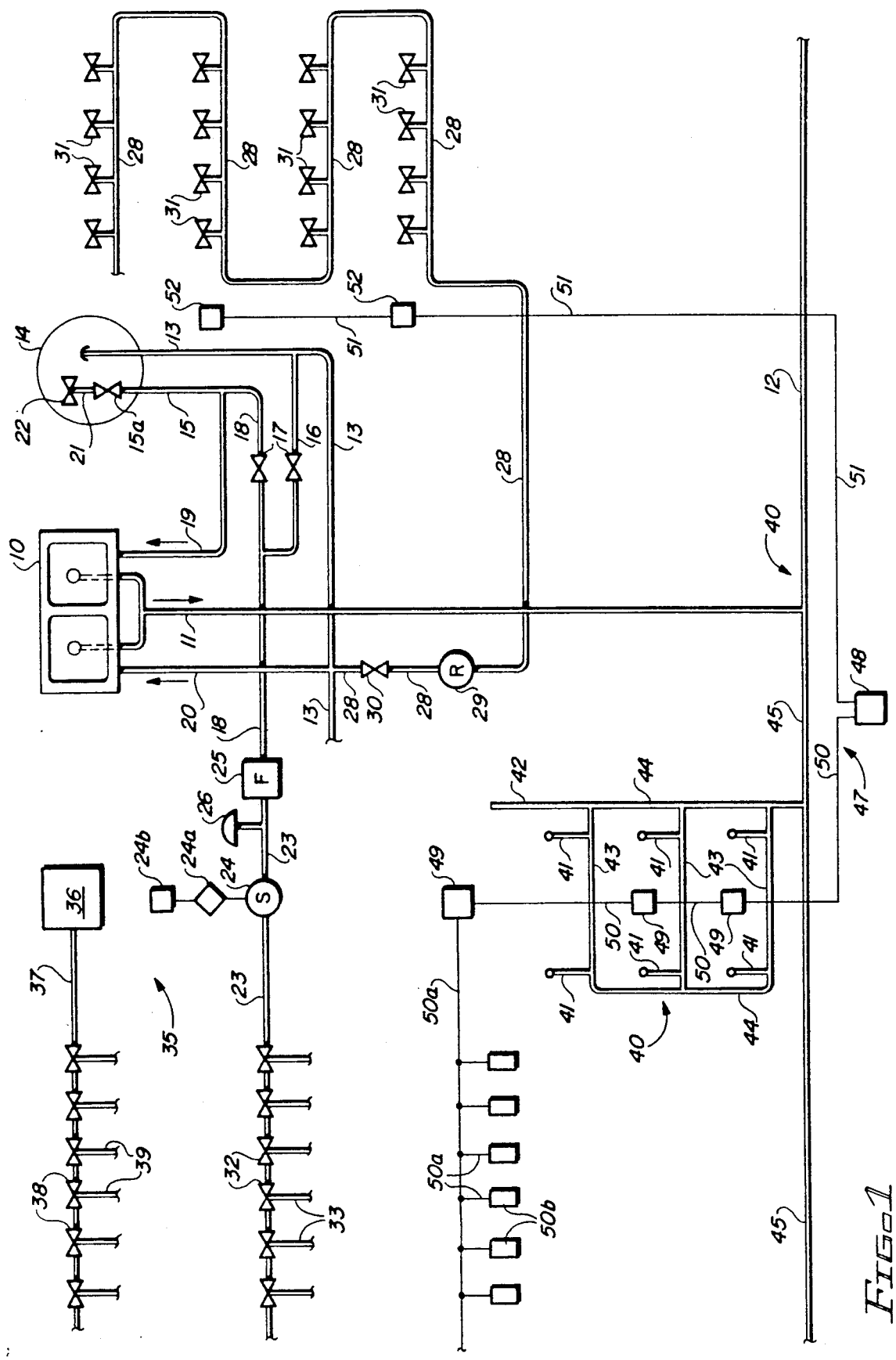
FIG. 1 is a schematic diagram illustrating a preferred air, water and electrical supply and distribution system for the aquarium and bird and animal containment system of this invention.
Figure 2:
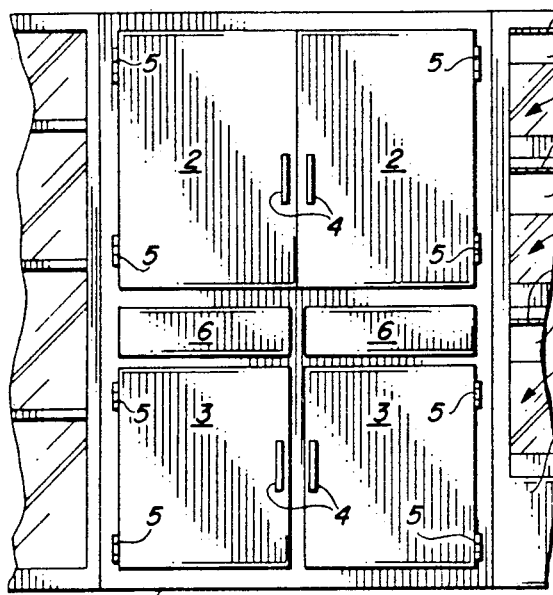
FIG. 2 is a front view, partially in section, of the cabinet element of the aquarium and bird and animal containment system.
Figure 3:
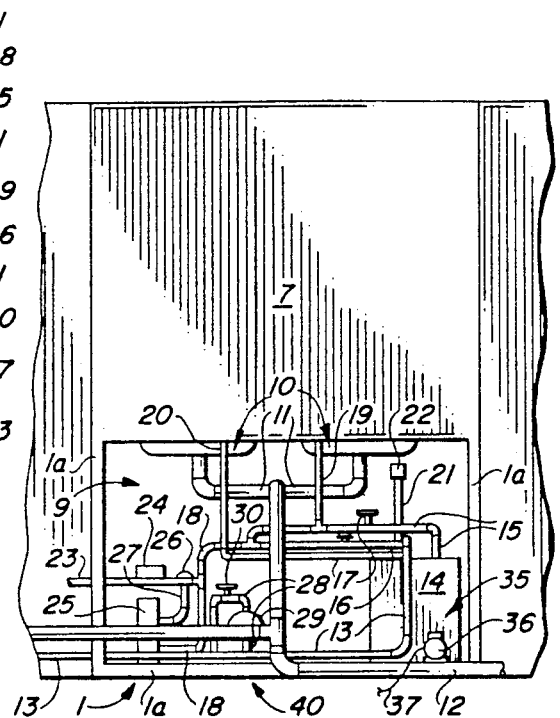
FIG. 3 is a rear view of the cabinet illustrated in FIG. 2, more particularly illustrating a water and air supply and distribution system provided in the cabinet.

Referring initially to FIGS. 1-3 of the drawings, the aquarium and animal containment system of this invention includes a cabinet, generally illustrated by reference numeral 1. The cabinet 1 is characterized by a rectangular-shaped, upright cabinet frame 1a, having a pair of top doors 2 and bottom doors 3, spaced by fixed center panels 6. Each of the top doors 2 and bottom doors 3 further include door grips 4 and are mounted to the cabinet frame 1a by means of door hinges 5. As illustrated in FIG. 3, the cabinet 1 further includes a rear panel 7, which covers the top segment of the cabinet frame 1a, while the bottom segment of the cabinet frame 1a is open, in order to accommodate a water supply system 9, an air supply system 35 and the sink drain line 11 of a drain system 40. As further illustrated in FIGS. 1 and 3, the water supply system 9 includes a dual sink 10, mounted in the cabinet frame 1a and accessed by the top doors 2. The dual sink 10 is connected to the sink drain line 11, which joins a common drain line 12 at the base of the cabinet 1, which common drain line 12 connects to a sewer line (not illustrated). A water supply line 13 is attached at the supply end to a source of water such as the city water supply or a well (not illustrated) and is secured at the opposite end to a water heater 14. A hot water supply line 15 extends from the water heater 14 to a discharge water mix line 18 and a hot water valve 15a is provided in the hot water supply line 15 as illustrated in FIG. 1, in order to stop or control the flow of hot water through the hot water supply line 15. A cold water mix line 16 is attached to the water supply line 13 and extends past the point of attachment of the hot water supply line 15 to the water heater 14, to define the discharge water mix line 18. A mixing valve 17 is provided in the hot water supply line 15 and the cold water mix line 16, respectively, in order to control the temperature of the water flowing through the discharge water mix line 18. The discharge water mix line 18 is attached to a carbon filter 25 and flows through the carbon filter 25 and a filter discharge line 27, into an aquarium water supply line 23. The carbon filter 25 serves to remove chlorine, ammonia and other materials such as heavy metals which are toxic to fish and other marine life. A hot water sink line 19 extends from the hot water supply line 15 to the dual sink 10, while a cold water sink line 20 projects from the water supply line 13 to the dual sink 10. A pressure relief line 21 projects upwardly from the water heater 14 and is fitted with a pressure release valve 22 on the top end thereof. A solenoid valve 24 is mounted in the aquarium water supply line 23 and is futher fitted with a transformer 24a and a timer 24b, as illustrated in FIG. 1, in orderr to supply water at a selected temperature through the aquarium water supply line 23 at selected timed intervals, as hereinafter further described. A thermometer 26 is also provided in the aquarium water supply line 23 for monitoring the temperature of the water flowing therein.

Figure 7:
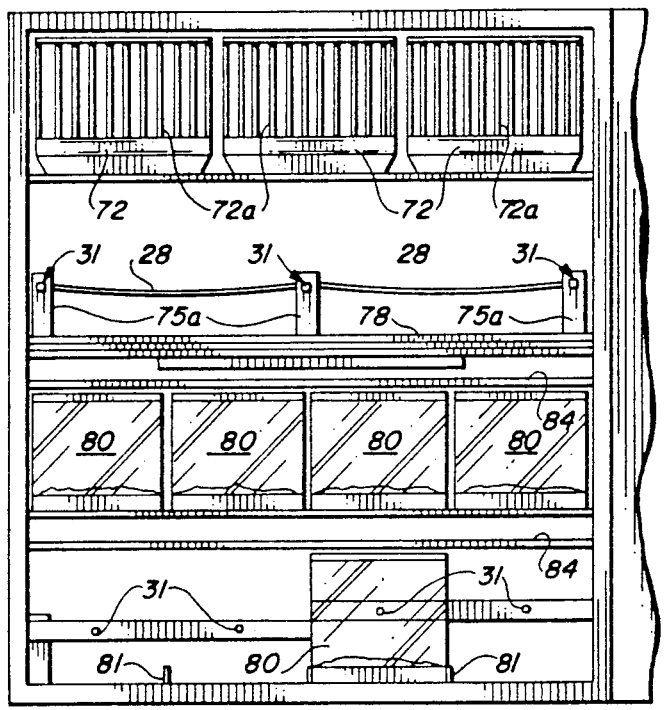
FIG. 7 is a front view of a bird and animal support, with several of the bird cages and animal cages removed.
Figure 8:
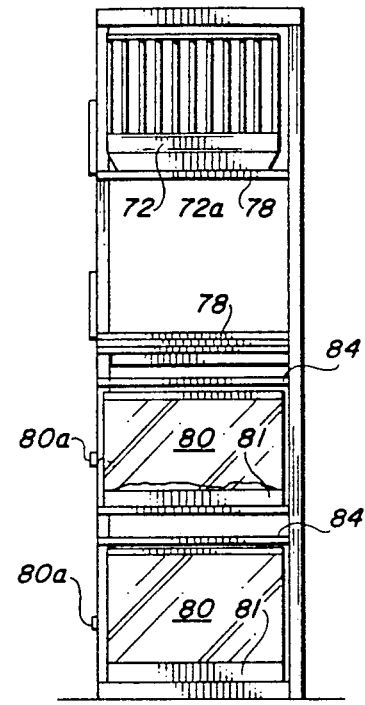
FIG. 8 is a side view of the bird and animal support illustrated in FIG. 7.
Figure 9:
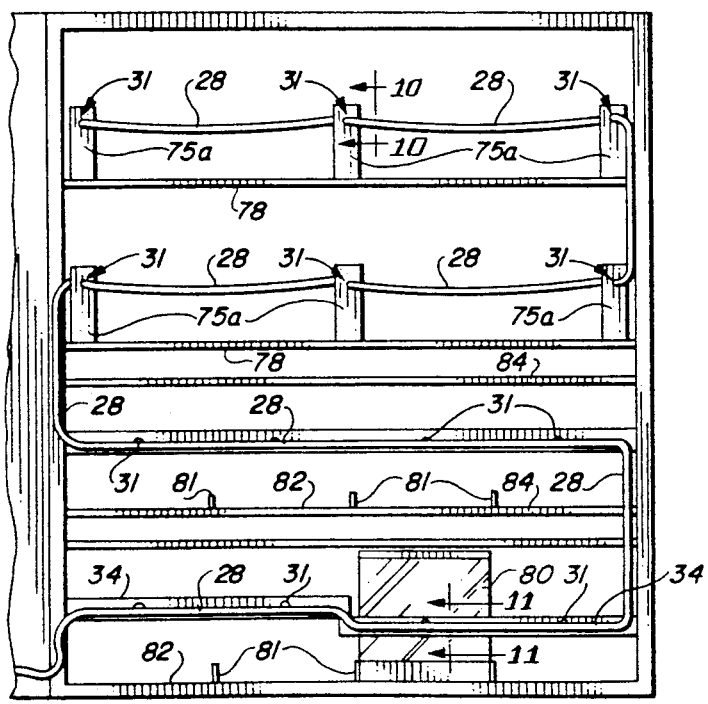
FIG. 9 is a rear view of the bird and animal support illustrated in FIGS. 7 and 8.
Figure 10:
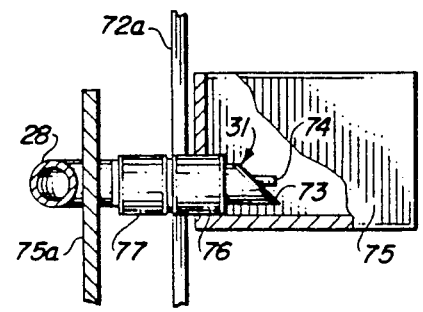
FIG. 10 is a side sectional view of a preferred pressure actuated valve for the bird cages located in the bird and animal support illustrated in FIGS. 7-9.
Figure 11:
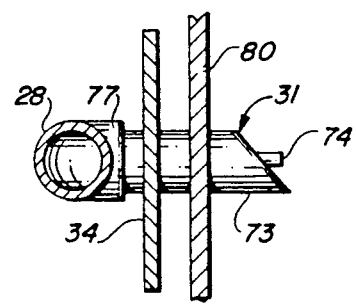
FIG. 11 is a side sectional view of a pressure actuated valve for the animal cages located in the bird and animal support illustrated in FIGS. 7-9.

Referring now to FIGS. 1, 2 and 7-11, a bird and animal water supply line 28 extends from the water supply line 13 through a bird and anmial support 71, illustrated in FIGS. 7-9, for the purpose of supplying water to birds and animals located in the bird cages 72 and animal cages 80, respectively, provided in the bird and animal support 71. In a preferred embodiment, a pressure regulator 29 is located in the bird and animal water supply line 28, as well as a water control valve 30, in order to closely control the pressure and flow rate of the water flowing through the bird and animal water supply line 28. This control is necessary to insure proper operation of the pressure-actuated valves 31, illustrated in FIGS. 10 and 11 and located in the bird and animal support 71, for servicing the bird cages 72 and the animal cages 80, as further hereinafter described.

Figure 4:
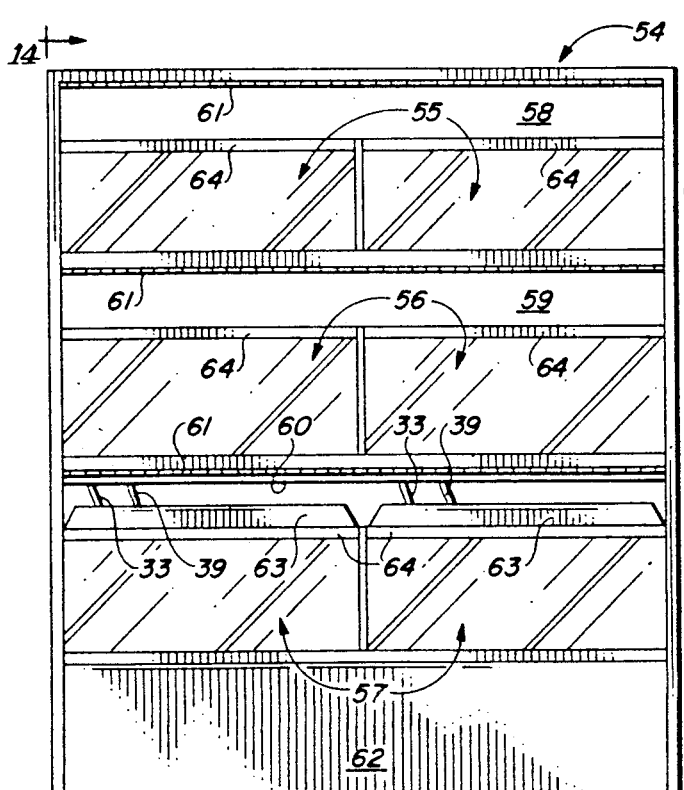
FIG. 4 is a front view of an aquarium support or rack fitted with six aquariums.

Referring to FIGS. 1 and 4-6 of the drawings, the aquarium water supply line 23 is provided with multiple aquarium water valves 32, having aquarium water lines 33 extending therefrom, to service each of the top aquariums 55, middle aquariums 56 and bottom aquariums 57, located in the aquarium support 54, illustrated in FIG. 4. As further illustrated in FIGS. 1 and 2, the air supply system 35 is also provided in the cabinet 1 for supplying air to bacterial filters 68, provided in the top aquariums 55, middle aquariums 56 and bottom aquariums 57. The air supply system 35 includes an air compressor 36, an air suplly line 37 extending from the air compressor 36 and air supply valves 38 disposed between the air supply line 37 and the bacterial filters 68, to service each of the bacterial filters 68, as hereinafter further described.

Referring again to FIGS. 1-6 of the drawings, the drain system 40 is further characterized by tank drain lines 41, each provided with a drain line filter 46 for draining each of the top aquariums 55, middle aquariums 56 and bottom aquariums 57 from points near the top edges thereof, collection drain lines 43, which receive the tank drain lines 41 and a vent line 42, provided on one of two parallel, vertical drain lines 44, which vertical drain lines 44 collect waste water draining from the collection drain lines 43, as illustrated in FIG. 1. An aquarium drain line 45 is located beneath the vertical drain lines 44 and receives waste water from the vertical drain lines 44 to channel the waste water into the common drain line 12, located at the base of the cabinet 1, as further illustrated in FIG. 1. Water of selected temperature is periodically caused to flow by line pressure from the water heater 14 and water supply line 13, through the discharge water mix line 18, the aquarium water supply line 23 and the individual aquarium water lines 33 to the top aquariums 55, middle aquariums 56 and bottom aquariums 57, thereby causing the water contained therein to overflow through the drain line filters 46 and corresponding tank drain lines 41. Intermittent flow of the fresh water into the top aquariums 55, middle aquariums 56 and bottom aquariums 57 at selected timed intervals is effected by the solenoid valve 24, operated by the transformer 24a and timer 24b.

Figure 5:
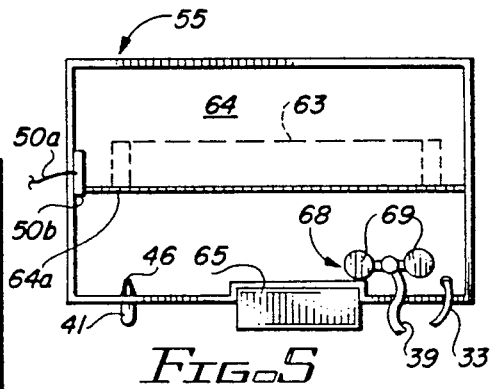
FIG. 5 is a top view of a typical aquarium provided in the aquarium support illustrated in FIG. 4.
Figure 6:
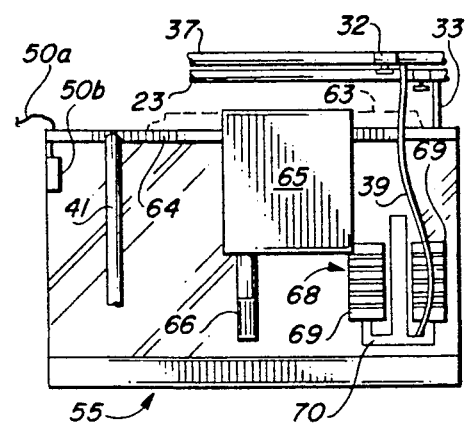
FIG. 6 is a rear view of the aquarium illustrated in FIG. 5.

As further illustrated in FIG. 1, an electrical system 47 is designed to serve the top aquariums 55, middle aquariums 56, bottom aquariums 57 and bird cages 72, as well as the animal cages 80. The electrical system 47 is further characterized by a central breaker box 48 and multiple aquarium breaker boxes 49, extending from an aquarium feeder conductor 50, for illuminating the various fluorescent lights (not illustrated) located in the light fixtures 63 and illuminating the top aquariums 55, middle aquariums 56 and bottom aquariums 57. As illustrated in FIGS. 1, 5 and 6, a heater conductor 50a extends from one of the aquarium breaker boxes 49 serviced by the aquarium feeder conductor 50 and submersible heaters 50b are attached to the heater conductor 50a, in order to heat the water in the top aquariums 55, middle aquariums 56 and bottom aquariums 57, respectively, and maintain the water at a desirable temperature. Digital thermometers (not illustrated) are provided on the submersible heaters 50b. Moreover, a bird and animal feeder conductor 51 extends to the bird and animal support 71 to service the bird and animal breaker boxes 52 and provide a lighting system (not illustrated), for the bird cages 72 and animal cages 80.

Figure 14:
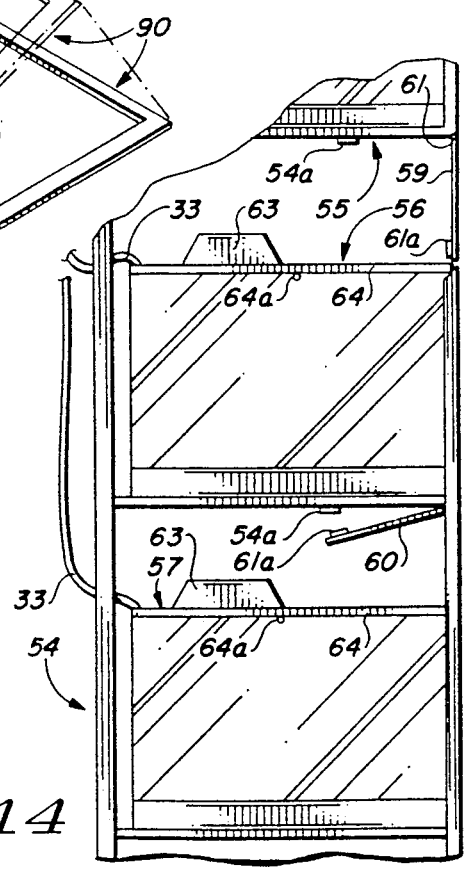
FIG. 14 is a sectional view taken along line 14—14 of the aquarium support illustrated in FIG. 4, more particularly illustrating a preferred mounting of the aquariums and positioning of hinged access doors or panels located at the front of the aquarium support for accessing the aquariums.

Referring again to FIGS. 4-6 of the drawings, in a most preferred display configuration, the aquarium support 54 contains two top aquariums 55, two middle aquariums 56 and two bottom aquariums 57, arranged in stacked sets. Each of the light fixtures 63 is mounted on a transparent cover 64, attached to the respective top aquariums 55, middle aquarims 56 and bottom aquariums 57, respectively, by means of a cover hinge 64a, for illuminating the contents thereof, such that the marine life located therein can be easily seen by a person or persons standing in front of the aquarium support 54. A top access door 58 is hingedly attached to the top portion of the aquarium support 54 above and adjacent to the top aquariums 55, by means of a door hinge 61, as illustrated in FIG. 14. Similarly, a middle access door 59 and bottom access door 60 are hingedly attached to the aquarium support 54 in vertically spaced relationship immediately above and adjacent to the middle aquarium 56 and bottom aquariums 57, respectively, by means of door hinges 61. A bottom panel 62 is located beneath the bottom aquariums 57 in the same plane as the top access door 58, middle access door 59 and bottom access door 50, to complete the front face of the aquarium support 54. In a most preferred embodiment of the invention the inside bottom edges of the top access door 58, middle access door 59 and bottom access door 60 are each provided with one or more door magnets 61a, which may be aligned with corresponding magnets 54a mounted on the aquarium support 54, in order to secure the top access door 58, middle access door 59 and bottom access door 60 in raised or open condition, as illustrated in FIG. 4 with respect to the bottom access door 60. Alternatively, where the aquarium support 54 is constructed of a ferrous metal, the door magnets 61a will engage the aquarium support 54 without the necessity of using a magnet 54a. This facility allows access to the light fixtures 63 and the corresponding transparent covers 64, covering the top of the top aquariums 55, middle aquariums 56 and bottom aquariums 57, the removing and depositing fish and other marine life, as well as for feeding, inspection and maintenance purposes.

Each of the top aquariums 55, middle aquariums 56 and bottom aquariums 57 is further provided with a mechanical filter 65, which includes a removable mechanical filter element 66, projecting into the water, in order to recirculate and filter the water therein, eitehr continuously, intermittantly by operation of a timer (not illustrated) or on demand. The removable mechanical filter element 66 in the mechanical filter 65 is designed to collect suspended solid organic compounds and particles and prevent the build-up of such compounds and particles in the top aquariums 55, middle aquariums 56 and bottom aquariums 57, respectively. In another preferred embodiment of the invention, a bacterial filter 68 is provided in each of the top aquariums 55, middle aquariums 56 and bottom aquariums 57, which bacterial filter 68 contains a pair of sponge filter elements 69 that contain aerobic bacteria for converting the ammonia in fish waste and urine to nitrates, which are less harmful to marine life. Each bacterial filter 68 is air-operated and the air is delivered to the bacterial filter 68 through the aquarium air lines 39, supplied by the air compressor 36. Air is pumped to the bottom of each T-shaped air nozzle 70, which communicates with the sponge filter elements 69 and the air rises to the top of the air nozzle 70, where it is released and bubbles to the surface, thereby aerating the water. The rising air creates a low pressure zone in, and pulls water through, the sponge filter elements 69, causing the bacteria in the sponge filter elements 69 to contact the ammonia-containing waste and convert it to the nitrate compound. Like the mechanical filter 65, the bacterial filter 68 can be operated continuously, intermittantly by means of a timer (not illustrated) or manually, on demand; however, continuous operation is preferred.

Referring again to FIGS. 7-13 of the drawings, in another preferred embodiment of the invention the lower segment of the bird and animal support 71 is provided with parallel, vertically spaced face plates 34, which receive the bird and animal water suplly line 28, and the valve spouts 73 of the pressure actuated valves 31, illustrated in FIG. 11, project through openings (not illustrated) in the valve face plates 34. Corresponding openings (not illustrated) are provided in the rear wall of the animal cages 80, in order to receive the extending, bevelled ends of the valve spouts 73, respectively, such that each valve trigger 74 can be accessed by an animal on demand and water is caused to flow from the bird and animal water supply line 28 through the valve spout 73, to the animal. Similarly, referring to FIG. 10, a bird cup 75 is mounted on a cup mount collar 76, loosely encircling each tapered valve spout 73, in order to provide water to birds in the bird cages 72, wherein the birds engage the valve trigger 74 with their beaks and receive water while ingesting bird seed placed in the bird cup 75. A supply line fitting 77 is provided on the rear portion of the valve spout 73, in order secure the bird and animal water supply line 28, extending through the upper segment of the bird and water supply 71, to the valve spout 73. It will be appreciated that the cup mount collar 76 is also attached to one or more of the cage bars 72a, in addition to the bird cup 75, to facilitate slidable removal of the valve spouts 73 from the respective cup mount collars 76 when the bird cages 72 are removed from the bird and animal support 71. Accordingly, as illustrated in FIGS. 7-13, each of the bird cages 72 and animal cages 80 is slidably positioned in the bird and animal support 71 and water is supplied to the bird cages 72 and the animal cages 80 by means of the pressure actuated valves 31, illustrated in FIGS. 10 and 11, respectively. Regarding the bird cages 72, in a preferred embodiment the valve spout 73 of each pressure actuated valve 31 is mounted on an upward-standing cup support 75a, which is fixed to the bird cage support 78 of the bird and animal feeder support 71, and receives the bird and animal water supply line 28 as illustrated in FIGS. 7 and 9. Accordingly, it will be appreciated that the bird and animal water supply line 28 extends between the various cup supports 75a in the upper portion of the bird and animal support 71 to orient each of the pressure actuated valves 31 such that the bird cages 72 can be slidably placed on the bird cage support 78 and each valve spout 73 aligned with a corresponding cup mount collar 76 of the bird cup 75, to extend the bevelled end of the valve spout 73 into the bird cup 75 when the bird cage 72 is located in the bird and animal support 71, as illustrated in FIGS. 7 and 8. Similarly, the animal cages 80 are slidably mounted in the bird and animal support 71 between the parallel cage dividers 81 on the animal cage supports 82, as illustrated in FIGS. 7-9. The rear portion of the valve spout 73 in each pressure actuated valve 31 is fixedly attached to the valve face plate 34, which is secured to the bird and animal feeder support 71, as further illustrated in FIGS. 7 and 9 of the drawings. Accordingly, the animal cages 80 can be individually slidably removed and inserted between the respective cage dividers 81, mounted on the animal cage supports 82, wherein the extending ends of the valve spout 73 and the corresponding valve trigger 74 are inserted through the openings (not illustrated) in the back wall of the animal cages 80 when the animal cages 80 are inserted in the bird and animal feed support 71.

Figure 12:
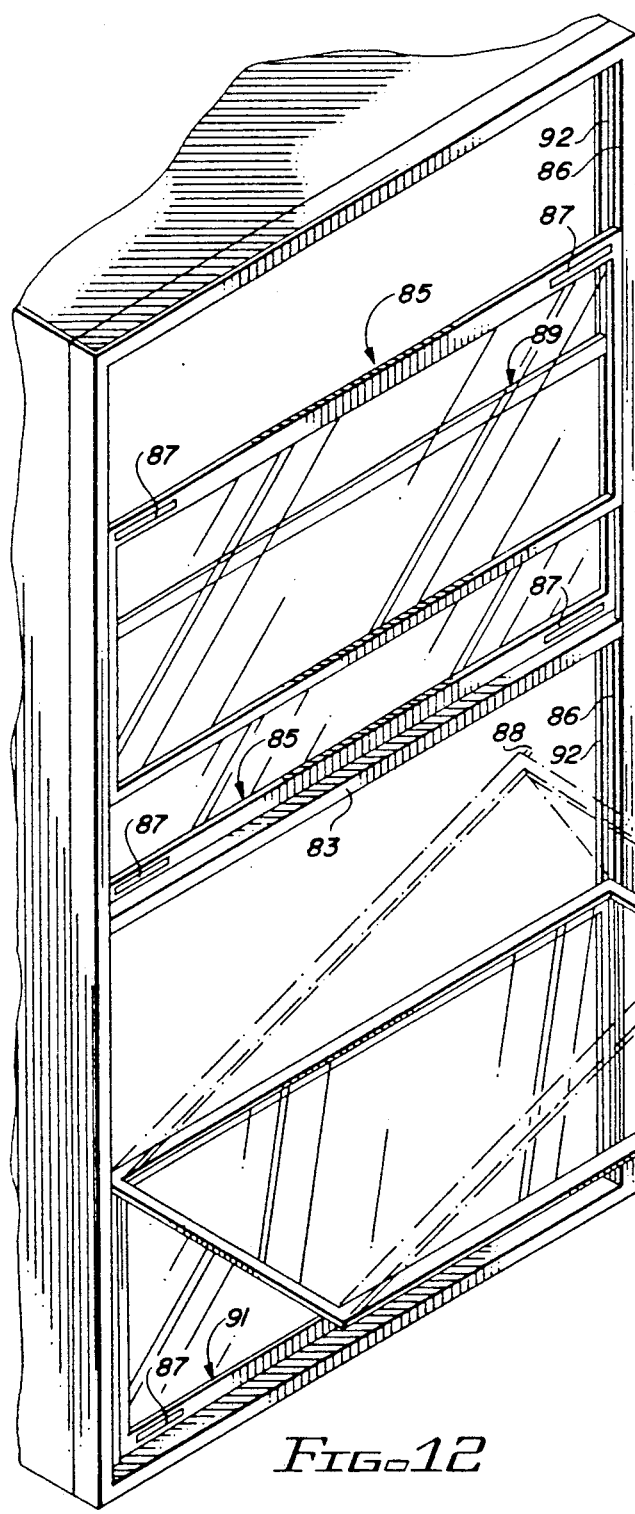
FIG. 12 is a perspective view, partially in section, of the bird and animal support illustrated in FIGS. 7-9, more particularly illustrating a preferred technique for insertion and removal of one of the four sliding "Plexiglass" windows.
Figure 13:
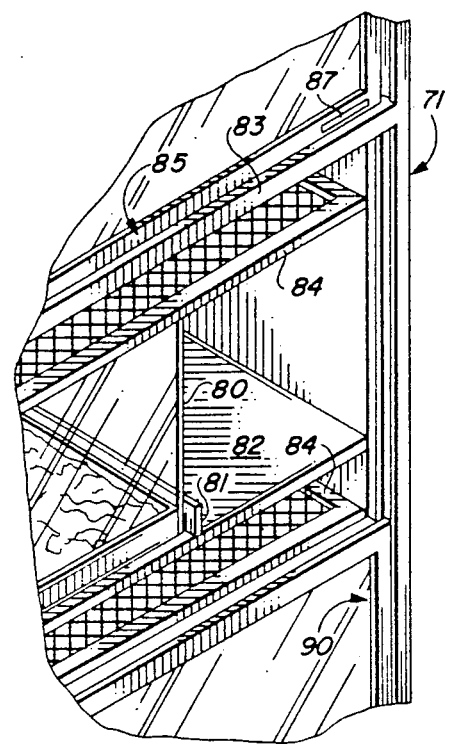
FIG. 13 is a perspective view, partially in section, of a front portion of the bird and animal support illustrated in FIGS. 7-9, more particularly illustrating fixed, horizontal cage guards which are mounted in the bird and animal support in spaced relationship to cover the tops of the animal cages.

Referring now to FIGS. 12 and 13 of the drawings, in still another preferred embodiment of the invention the bird and animal support 71 is provided with a spacer bar 83, located approximately half the distance between the top and the bottom of the bird and animal support 71 and with fixed, parallel, horizontal cage guards 84, which cover the tops of the animal cages 80 when the animal cages 80 are inserted in the bird and animal support 71. Furthermore, a top bird cage window 85 is slidably mounted in a pair of parallel outside window tracks 86, located above the spacer bar 83. Moreover, a bottom bird cage window 89 is mounted on parallel inside window tracks 92, disposed adjacent to and inwardly of the outside window tracks 86. Accordingly, it will be appreciated from a consideration of FIG. 12, that the top bird cage window 85 can be slidably disposed downwardly in the outside window tracks 86 to align with the bottom bird cage window 89, when it is desired to access and remove one or more of the top row of bird cages 72 in the bird and animal support 71. Similarly, the bottom bird cage window 89 can be slidably moved upwardly in the parallel inside window tracks 92, to align with the top bird cage window 85, when it is desired to access and remove one or more of the second row of bird cages 72 provided in the bird and animal support 71. In like manner, a top animal cage window 90 is slidably mounted in the outside window tracks 86 of the bird and animal support 71 beneath the spacer bar 83, while a bottom animal cage window 91 is slidably mounted in the inside window tracks 92. Accordingly, the top animal cage window 90 can be slidably manipulated downwardly in the outside window tracks 86 in alignment with the bottom animal cage window 91, when it is desired to access and slidably remove one or more of the top row of animal cages 80. Similarly, the bottom animal cage window 91 can be slidably moved upwardly in the inside window tracks 92 in alignment with the top animal cage window 90, when it is desired to access and slidably remove one or more of the bottom row of animal cages 80 in the bird and animal support 71. In another most preferred embodiment of the invention, finger slots 87 and finger locks (not illustrated) are provided in the top bird cage window 84, bottom bird cage window 89, to animal cage window 90 and bottom animal cage window 91, to facilitate grasping and slidable manipulation thereof in the parallel outside window tracks 86 and inside window tracks 92, respectively. As further illustrated in FIG. 12, a window pin 88 is provided in each bottom end of the top bird cage window 85, bottom bird cage window 89, top animal cage window 90 and bottom animal cage window 91, in order to facilitate removal and insertion thereof in the outside window tracks 86 and inside window tracks 92, respectively, by releasing the finger locks and tilting the respective window, as illustrated.

Referring again to FIG. 4 of the drawings, in a most preferred embodiment of the invention the front and side walls or panels of the top aquariums 55, middle aquariums 56 and bottom aquariums 57 are transparent and constructed of glass or other clear material such as "Plexiglass", while the bottom is painted black or dark blue or green and the remaining opposite viewable wall or panel is textured and tinted to simulate an underwater seascape. This facility reduces stress and resultant disease in the fish and other marine life.

It will be appreciated by those skilled in the art that the aquarium and animal and bird containment system of this invention offers a convenient, compact and easily viewable and maintained system for placing marine life such as fish, as well as birds and animals on display in pet shops and other stores. The top aquariums 55, middle aquariums 56 and bottom aquariums 57, as well as the bird cages 72 and animal cages 80 are easily accessed, inspected, cleaned and maintained in the aquarium support 54 and the bird and animal support 71, respectively, and cleaning of the various equipment is conveniently accomplished by using the dual sink 10 located in the cabinet 1, after opening the top doors 2. Access to the water supply system 9, air supply system 35, drain system 40 and electrical system 47 is easily provided at the rear of the cabinet 1, or by opening the bottom doors 3. Furthermore, the aquarium water supply line 23, aquarium water lines 33, air supply line 37, aquarium air lines 39, tank drain lines 41, collection drain lines 43, vertical drain lines 44, aquarium drain line 45, common drain line 12, aquarium feeder conductor 50, bird and animal supply line 28 and bird and animal feeder conductor 51 are easily accessible at the rear of the aquarium support 54 and the bird and animal support 71, while the front viewing areas of the cabinet 1, aquarium support 54 and the bird and animal support 71 present an esthetically pleasing and convenient access and view to the marine life, birds and animals located in the top aquariums 55, middle aquariums 56, bottom aquariums 57, as well as the bird cages 72 and animal cages 80, respectively. The aquarium and bird and animal containment system is characterized by minimum maintenance requirements, since the aquarium water is automatically heated and filtered, both mechanically and biologically, and the water is periodically exchanged by timed and filtered water-introduction sequences. The animal cages 80 are constructed of glass or "Plexiglass" for optimum viewability and, along with the bird cages 72, are easily removed by sliding them outwardly of the support. However, it is understood that the bird cages 72 may be permanently mounted in the bird and animal support 71, with doors located in the bars for access. The hinged glass or "Plexiglass" transparent cover 64 on the aquariums prevent fish and other marine life from jumping, or crawling out of the aquariums and the textured coating provided on the aquariums for esthetic purposes and to reduce stress in the marine life may be any desired color. No gravel is present in the aquariums, in order to avoid trapping toxic wastes, disease or decaying food.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An aquarium and bird and animal containment system comprising an aquarium support; a plurality of aquariums provided in said aquarium support in stacked sets; aquarium drain lines provided in said aquariums and a common drain line receiving said aquarium drain lines for draining water from said aquariums; at least one access door hingedly carried by said aquarium support adjacent to each of said stacked sets of said aquariums for accessing said aquariums, respectively; a heater provided in said aquariums for controlling the temperature of the water in said aquariums; cabinet means located adjacent to said aquarium support; a sink provided in said cabinet means; a water heater disposed in said cabinet means; a cold water supply line connected to a water source, said cold water supply line extending from the water source and connected to said water heater for supplying cold water to said water heater; a hot water supply line connected to said water heater for discharging hot water from said water heater; a mixed water line extending from said hot water supply line and said cold water supply line to said aquariums for supplying water of selected temperature to said aquariums and valve means provided in said cold water supply line, said hot water supply line and said mixed water line for adjusting the temperature and flow of water through said mixed water line; air pressurizing means located in said cabinet means and an air supply line extending from said air pressurizing means to said aquariums for supplying air to said aquariums; bacterial filter means provided in said aquariums and coupled to said air supply line for causing air and water to flow through said bacterial filter means and filtering the water in said aquariums; and mechanical filter means provided in said aquariums for filtering the water entering said aquariums.

2. The aquarium and bird and animal containment system of claim 1 further comprising a bird and animal support located adjacent to said, cabinet means at least one bird cage and at least one animal cage slidably disposed in said bird and animal support, a bird and animal water supply line connected to said water supply and distribution means, said bird and animal water supply line extending through said bird and animal support to said bird cage and said animal cage, and pressure-actuated valve means provided on said bird and animal water supply line and adapted for insertion in the bird cage and animal cage, respectively, for supplying water on demand to birds and animals in said bird cage and said animal cage, respectively.

3. The aquarium and bird and animal containment system of claim 2 further comprising a transparent cover hingedly carried by each of said aquariums for preventing marine life from exiting said aquariums.

4. The aquarium and bird and animal containment system of claim 3 further comprising a light carried by said transparent cover for illuminating said aquariums.

5. An aquarium and bird and animal containment system comprising an aquarium support; a plurality of aquariums provided in said aquarium support in stacked sets; a plurality of access doors hingedly carried by said aquarium support adjacent to each of said stacked sets for accessing said aquariums, respectively; a cabinet positioned adjacent to said aquarium support; a sink and a water heater disposed in said cabinet; a cold water line extending from a water source and connected to said water heater for supplying cold water to said water heater; a hot water supply line connected to said water heater for discharging hot water from said water heater; a mixed water line extending from said hot water supply line and said cold water supply line to said aquariums and valve means provided in said cold water supply line, said hot water supply line and said mixed water line, for adjusting the temperature and flow of water to said aquariums, respectively, through said mixed water line; a bird and animal support positioned adjacent to said aquarium support and a plurality of bird and animal cages slidably disposed in said bird and animal support; and a bird and animal water supply line connected to said cold water supply line and extending to said bird and animal cages in said bird and animal support for supplying water to said bird and animal cages.

6. The aquarium and bird and animal containment system of claim 5 further comprising a drain line connected to each of said aquariums immediately below the top edge of said aquariums for draining water from said aquariums by overflow when water is supplied to said aquariums through said mixed water line.

7. The aquarium and bird and animal containment system of claim 6 further comprising a transparent cover hingedly carried by each of said aquariums for preventing marine life from exiting said aquariums.

8. The aquarium and bird and animal containment system of claim 7 further comprising a fluorescent light carried by said transparent cover for illuminating said aquariums.

9. The aquarium and bird and animal containment system of claim 8 further comprising:
(a) an air compressor located in said cabinet and an air supply line extending from said air compressor to said aquariums;
(b) a bacterial filter provided in said aquariums and coupled to said air supply line for causing air and water to flow through said bacterial filter and filtering the water in said aquariums;
(c) a mechanical filter provided in said aquariums for filtering the water in said aquariums; and
(d) a heater provided in each of said aquariums for controlling the temperature of the water in said aquariums.

10. The aquarium and bird and animal containment system of claim 5 further comprising an air compressor located in said cabinet and an air supply line extending from said air compressor to said aquariums.

11. The aquarium and bird and animal containment system of claim 10 further comprising a bacterial filter provided in said aquariums and coupled to said air supply line for causing air and water to flow through said bacterial filter and filtering the water in said aquariums.

12. The aquarium and bird and animal containment system of claim 11 further comprising a mechanical filter provided in said aquariums for filtering the water in said aquariums.

13. The aquarium and bird and animal containment system of claim 12 further comprising a heater provided in each of said aquariums for controlling the temperature of the water in said aquariums.

* * * * *